United States Patent
Henry et al.

(10) Patent No.: US 11,246,046 B2
(45) Date of Patent: Feb. 8, 2022

(54) PROACTIVE WIRELESS TRAFFIC CAPTURE FOR NETWORK ASSURANCE

(71) Applicant: Cisco Technology, Inc., San Jose, CA (US)

(72) Inventors: Jerome Henry, Pittsboro, NC (US); Robert Edgar Barton, Richmond (CA)

(73) Assignee: Cisco Technology, Inc., San Jose, CA (US)

(*) Notice: Subject to any disclaimer, the term of this patent is extended or adjusted under 35 U.S.C. 154(b) by 32 days.

(21) Appl. No.: 15/904,746

(22) Filed: Feb. 26, 2018

(65) Prior Publication Data

US 2019/0268788 A1 Aug. 29, 2019

(51) Int. Cl.
*H04W 24/08* (2009.01)
*H04W 24/04* (2009.01)
*H04W 36/24* (2009.01)
*H04W 64/00* (2009.01)
*H04L 12/24* (2006.01)

(52) U.S. Cl.
CPC .......... *H04W 24/08* (2013.01); *H04W 24/04* (2013.01); *H04W 36/24* (2013.01); *H04L 41/12* (2013.01); *H04W 64/006* (2013.01)

(58) Field of Classification Search
CPC ............. H04J 2203/006; H04J 14/0227; H04J 14/0294; G16H 50/20; G06F 11/0793; G06F 11/079; G06F 17/2785; G06F 3/00; G06F 11/0706; G06F 11/0751; G06F 11/0754; G06F 2009/45591; G06F 21/55; G06F 21/6254; G06F 2201/80; G06F 2201/81; G06F 9/45558; G06N 20/00; G06N 3/08; G06N 7/005; G06N 3/088; G06Q 10/20; G06Q 30/0627; G06Q 20/32; H04L 41/142; H04L 41/147; H04L 41/16; H04L 43/08; H04L 43/16; H04L 63/1408; H04L 67/22; H04L 69/40; H04W 4/38; G05B 23/0229
See application file for complete search history.

(56) References Cited

U.S. PATENT DOCUMENTS 7,974,387 B2  7/2011  Lutz et al.
8,587,630 B1  11/2013  Krinsky et al.
(Continued)

OTHER PUBLICATIONS

Thomas, Robert., "How to get a Packet Capture for Random failure.", https://supportforums.cisco.com/document/116721/how-get-packet-capture-random-failure, Aug. 2017, 6 pages, Cisco Systems Inc.

*Primary Examiner* — Yemane Mesfin
*Assistant Examiner* — Mon Cheri S Davenport
(74) *Attorney, Agent, or Firm* — Behmke Innovation Group LLC; James M. Behmke; James J. Wong (57) ABSTRACT

In one embodiment, a computing device determines one or more profiles of respective wireless network issues, each of the one or more profiles having a set of associated parameters. By monitoring wireless conditions in a particular wireless network, the computing device may then detect that the wireless conditions exhibit trigger conditions correlated to a particular set of associated parameters for a particular profile of a particular wireless network issue. In response to detecting that the wireless conditions exhibit trigger conditions, the computing device may then capture and store data regarding the wireless conditions, accordingly.

17 Claims, 6 Drawing Sheets

(56) References Cited

U.S. PATENT DOCUMENTS

| | | |
|---|---|---|
| 9,026,851 B2 | 5/2015 | Mondal et al. |
| 10,637,720 B2 * | 4/2020 | Bar-Joshua ............. H04L 41/12 |
| 2008/0056125 A1 * | 3/2008 | Kneckt ................... H04L 41/00 |
| | | 370/229 |
| 2014/0180738 A1 * | 6/2014 | Phillipps ............ G06Q 10/0631 |
| | | 705/7.12 |
| 2016/0112886 A1 * | 4/2016 | Malik ..................... H04W 4/80 |
| | | 370/225 |
| 2016/0242053 A1 | 8/2016 | Leontiadis et al. |
| 2016/0373306 A1 | 12/2016 | Saha et al. |
| 2017/0019291 A1 | 1/2017 | Tapia et al. |
| 2019/0220760 A1 * | 7/2019 | Kolar ................... H04L 41/142 |

\* cited by examiner

PROACTIVE WIRELESS TRAFFIC CAPTURE FOR NETWORK ASSURANCE

TECHNICAL FIELD

The present disclosure relates generally to computer networks, and, more particularly, to proactive wireless traffic capture for network assurance.

BACKGROUND

Wireless networks have become the primary network access method. However, transmission in this type of network is not deterministic in nature. User and traffic density change constantly, radio frequency (RF) conditions vary, and users move. The result is a large and apparently unrelated number of reported user issues (and support tickets), ranging from "I can't connect anymore" to "audio experience was awful during my last Wi-Fi call". Detecting the root cause of these wireless issues is challenging, and predicting them with traditional methods is difficult.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a computing device determines one or more profiles of respective wireless network issues, each of the one or more profiles having a set of associated parameters. By monitoring wireless conditions in a particular wireless network, the computing device may then detect that the wireless conditions exhibit trigger conditions correlated to a particular set of associated parameters for a particular profile of a particular wireless network issue. In response to detecting that the wireless conditions exhibit trigger conditions, the computing device may then capture and store data regarding the wireless conditions, accordingly.

Description

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Figure 1:
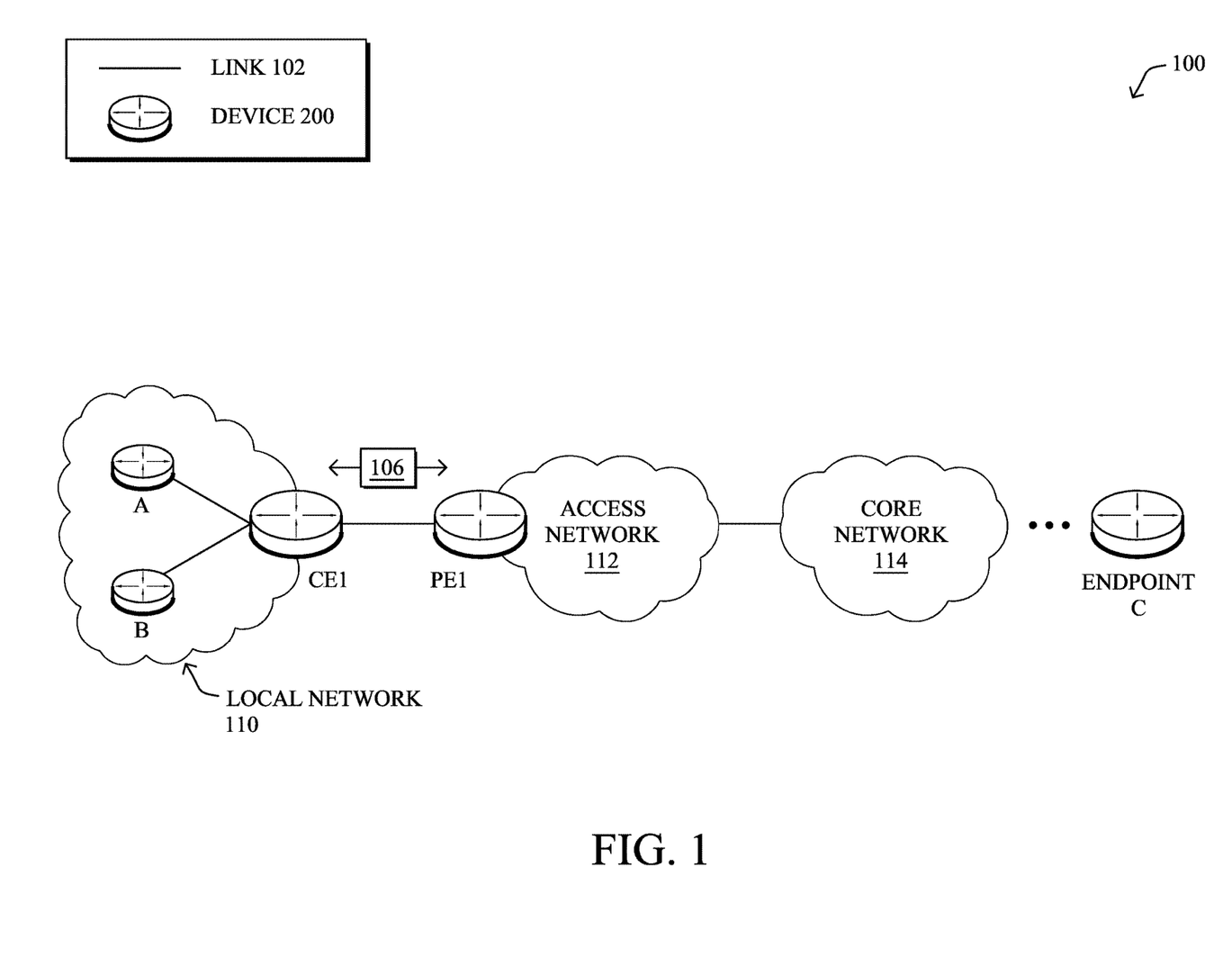
FIG. 1 illustrates an example communication network.

FIG. 1 is a schematic block diagram of an example communication network 100 illustratively comprising nodes/devices 200, such as a plurality of routers/devices interconnected by links and/or networks, as shown. For example, a customer edge (CE) router CE1 may interconnect nodes A and B on a local network 110 with a provider edge (PE) router PE1 of an access network 112. In turn, access network 112 may provide local network 110 with connectivity to a core network 114, such as the Internet.

The various nodes/devices 200 may exchange data packets 106 (e.g., traffic/messages) via communication network 100 over links 102 using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity. For example, node A in local network 110 may communicate with an endpoint node/device C (e.g., a remote server, etc.) via communication network 100.

As would be appreciated, links 102 may include any number of wired and/or wireless connections between devices. For example, node A may communicate wirelessly using a WiFi™ connection, CE1 and PE1 may communicate wirelessly using a cellular connection or via a hardwired connection (e.g., DSL, etc.), etc. In addition, while certain devices are depicted in FIG. 1, the view shown is a simplified view of communication network 100. In other words, communication network 100 may also include any number of intermediary networking devices such as, but not limited to, routers, switches, firewalls, etc., that are not shown.

In various embodiments, nodes/devices 200 may employ a secure communication mechanism, to encrypt and decrypt data packets 106. For example, nodes/devices 200 shown may use a Transport Layer Security (TLS) mechanism, such as the hypertext transfer protocol (HTTP) secure (HTTPS) protocol, to encrypt and decrypt data packets 106.

Figure 2:
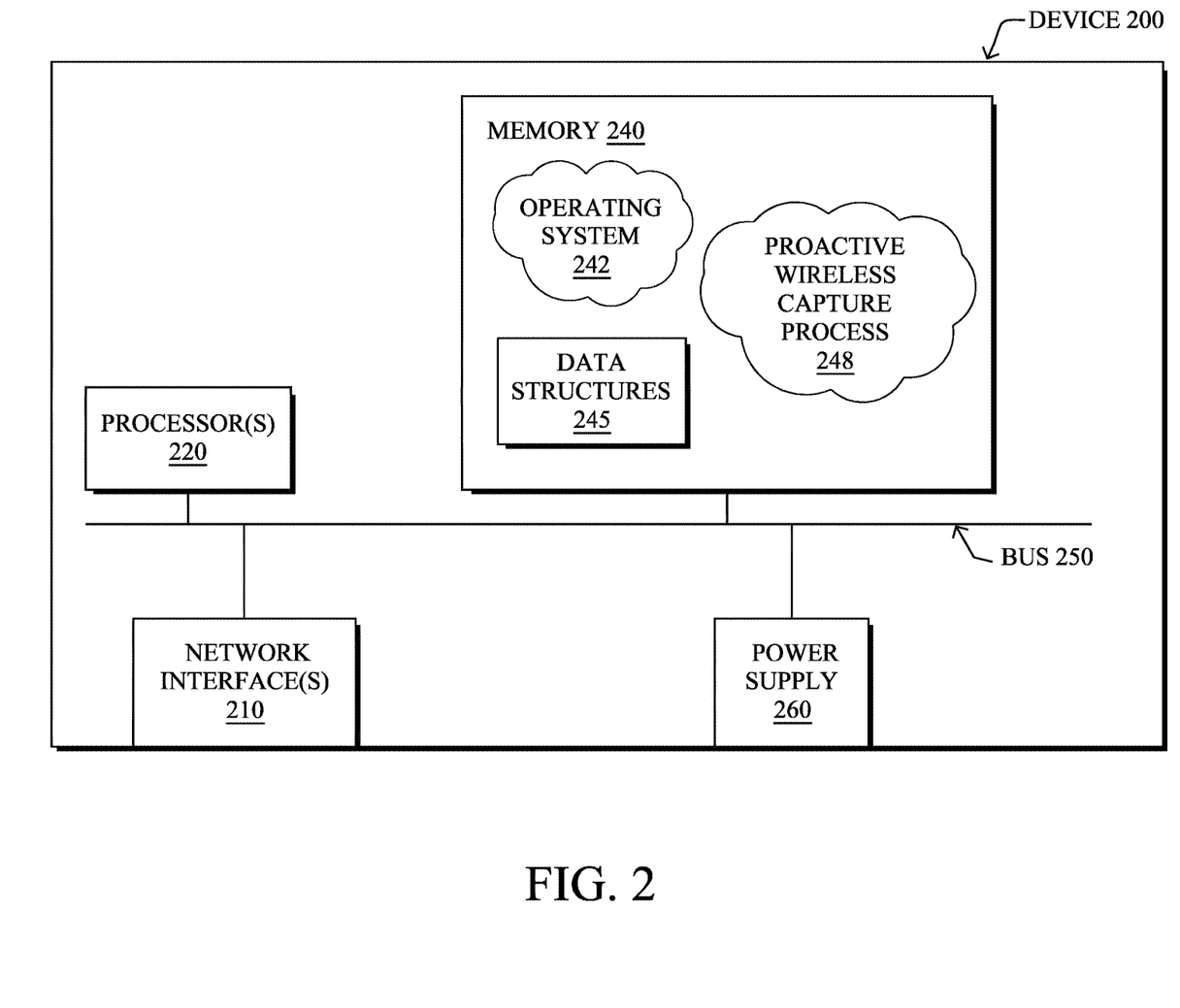
FIG. 2 illustrates an example network device/node.

FIG. 2 is a schematic block diagram of an example node/device 200 that may be used with one or more embodiments described herein, e.g., as any of the computing devices shown in FIG. 1, any other computing device that supports the operations of network 100 (e.g., switches, etc.), or any of the other devices referenced below. The device 200 may also be any other suitable type of device depending upon the type of network architecture in place. As shown, device 200 comprises one or more network interface(s) 210, one or more processor(s) 220, and a memory 240 interconnected by a system bus 250 and powered by a power supply 260.

The network interface(s) 210 include the mechanical, electrical, and signaling circuitry for communicating data over physical and/or wireless links coupled to the network 100. The network interfaces may be configured to transmit and/or receive data using a variety of different communication protocols. Notably, a network interface 210 may also be used to implement one or more virtual network interfaces, such as for virtual private network (VPN) access, known to those skilled in the art.

The memory 240 comprises a plurality of storage locations that are addressable by the processor(s) 220 and the network interface(s) 210 for storing software programs and data structures associated with the embodiments described herein. The processor 220 may comprise necessary elements or logic adapted to execute the software programs and manipulate the data structures 245. An operating system 242, portions of which are typically resident in memory 240 and executed by the processor(s), functionally organizes the node by, among other things, invoking network operations in support of software processors and/or services executing on the device. These software processors and/or services may comprise a proactive wireless capture process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In various embodiments, machine learning techniques may be utilized to perform some of the embodiments described herein. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

Computational entities that rely on one or more machine learning techniques to perform a task for which they have not been explicitly programmed to perform are typically referred to as learning machines. In particular, learning machines are capable of adjusting their behavior to their environment. For example, a learning machine may dynamically make future predictions based on current or prior network measurements, may make control decisions based on the effects of prior control commands, etc.

—Proactive Wireless Traffic Capture—

Figure 3:
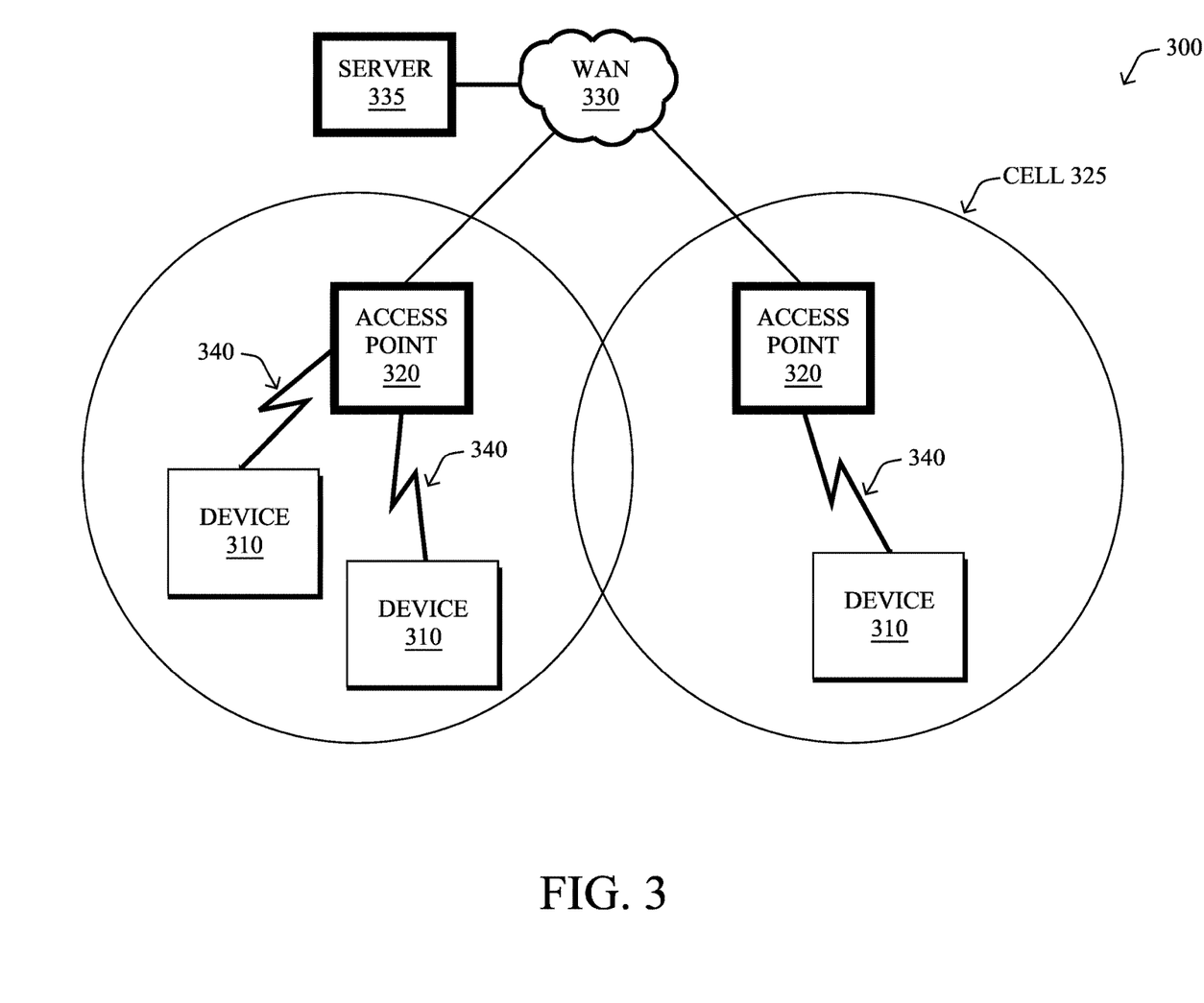
FIG. 3 illustrates an example wireless network.

FIG. 3 illustrates a simplified example of a wireless network 300, where wireless devices 310 (e.g., mobile devices, smartphones, laptops, sensors, etc.) communicate directly with access points (APs) 320 in order to reach each other or more generally a WAN 330 (e.g., and to a server 335) or other network (e.g., directly or else through local routers/switches/etc. prior). Notably, each AP 320 establishes a wireless signal for a given range (distance from the AP) that establishes a "cell" 325, though as used herein, the terms "AP", "cell", and "AP cell" may be used interchangeably where applicable. Wireless devices 310 within a particular cell 325 can communicate wireless traffic 340 with the associated APs 320 using various wireless protocols, such as Wi-Fi. (Notably, any suitable configuration of a wireless communication network may be used in accordance with the techniques herein, and network 300 is merely an example.)

As noted above, wireless networks have become the primary network access method. However, transmission in this type of network is not deterministic in nature. User and traffic density change constantly, radio frequency (RF) conditions vary, and users move. The result is a large and apparently unrelated number of reported user issues (and support tickets), ranging from "I can't connect anymore" to "audio experience was awful during my last Wi-Fi call". Detecting the root cause of these wireless issues is challenging, and predicting them with traditional methods is difficult.

Some networks have currently been configured to proactively capture data constantly, in order to make available enough material that root cause determination is made easier when troubleshooting tickets are opened. This method has proven very efficient, as each troubleshooting ticket can be matched against a supporting capture of traffic content and conditions (including RF parameters associated to the capture). Some access points are also currently being fitted with an additional radio that will be set persistently in capture mode. Unfortunately, this approach consumes a vast amount of storing resources (as 100% of all traffic, on all APs, all radios, is captured and stored, with individual radio history depth of several weeks). Most of the capture volume, however, stays unused, and this volume requirement is an issue for many network infrastructures (e.g., constrained devices, such as AP, have limited processing and memory resources).

The techniques herein, therefore, predict wireless network issue times and locations, and trigger automatic packet capture at these times and locations in order to limit the capture space to only those "hot spots" around which the probability of the occurrence of an issue reaches a critical threshold. The techniques herein dramatically reduce the volume of stored capture data, particularly by storing capture "pieces" (instead of continuous files). These stored segments can be made to deteriorate at different speeds based on the type of issue represented, and therefore can be automatically deleted at different rates if no matching investigation ("ticket") is open within a configurable time window.

Said differently, the techniques herein dynamically start and stop wireless network recording of traffic and other conditions on target radios, based on prediction of a local wireless network issue. The techniques herein may associate sets of attributes that are specific to each issue (issue-specific) and/or general to all issues. In turn, this association, coupled with key performance indicator (KPI) collection throughout the network, allows the system to detect attribute-assembly thresholds beyond which an issue is likely to occur. At that time, the system automatically starts recording wireless network traffic and other conditions, in order to provide (e.g., to a support team) a clear view of the issue context. Captures may be kept if the issue is reported, and deleted otherwise. Additionally, the system may self-refresh parameter-to-issue association weights to improve proactive issue detection.

Specifically, according to one or more embodiments of the disclosure as described in detail below, a computing device determines one or more profiles of respective wireless network issues, each of the one or more profiles having a set of associated parameters. By monitoring wireless conditions (e.g., traffic and other parameters) in a particular wireless network, the computing device may then detect that the wireless conditions exhibit trigger conditions correlated to a particular set of associated parameters for a particular profile of a particular wireless network issue. In response to detecting that the wireless conditions exhibit trigger conditions, the computing device may then capture and store data regarding the wireless conditions, accordingly.

Illustratively, the techniques described herein may be performed by hardware, software, and/or firmware, such as in accordance with the proactive wireless capture process 248, which may include computer executable instructions executed by the processor 220 to perform functions relating to the techniques described herein, e.g., in conjunction with other processes and/or other devices (e.g., on a centralized computing device, an access point, etc.).

Operationally, the techniques herein use a forensic analysis approach. For instance, with reference to FIG. 4, the algorithm 400 may search through a database 410 of open and resolved troubleshooting tickets (420 and 425, respectively) for a given local network (e.g., wireless network 300), organized in categories, and tries to establish profiles 430 of wireless network issue types 440.

Figure 4:
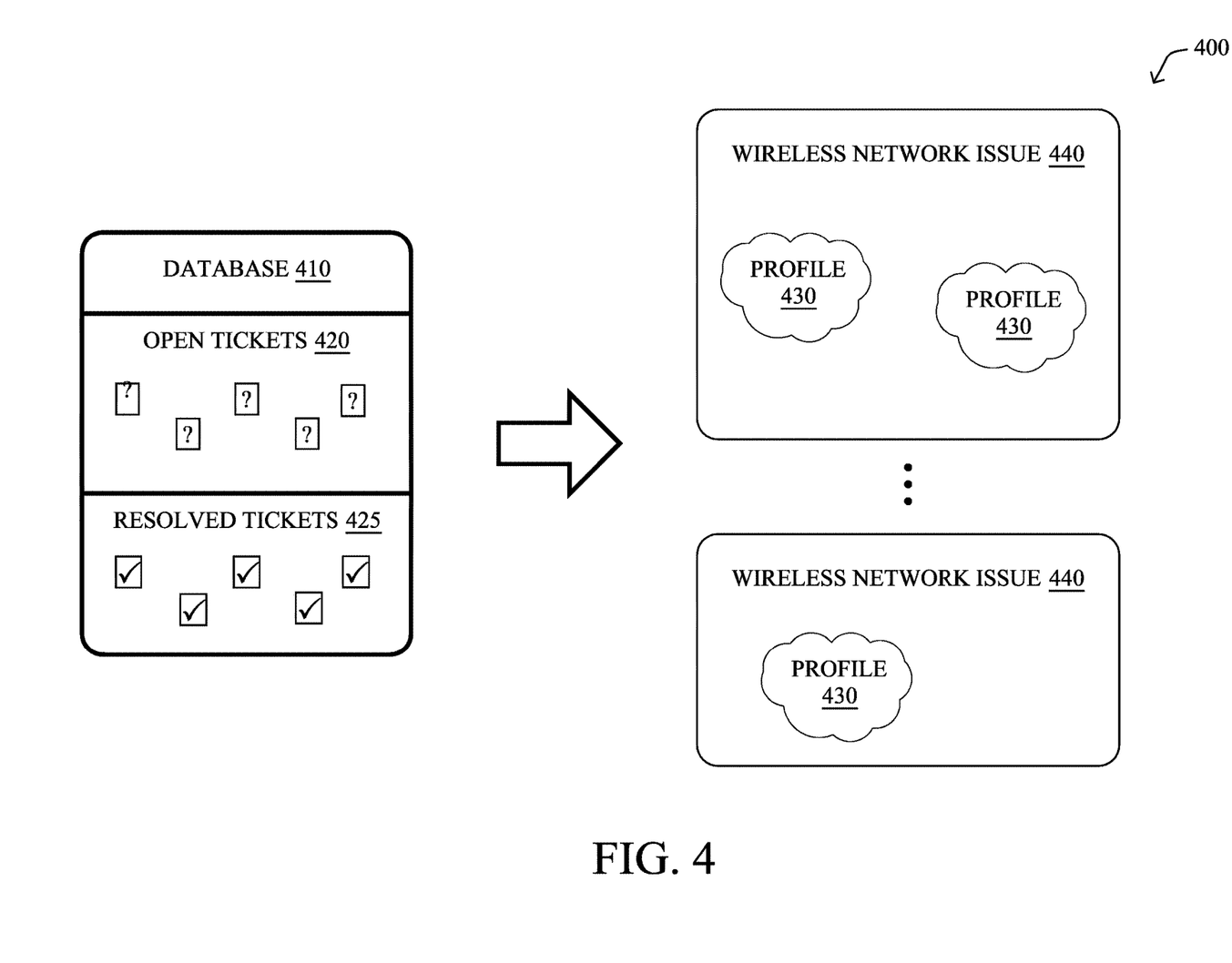
FIG. 4 illustrates an example algorithm for generating profiles of wireless network issues.

Each issue type 440 is different. For instance, the symptoms reported for poor audio quality are different from the symptoms reported for random disconnects. Different attributes thus need to be combined within one or more profiles 330 for each type of anticipated issue. (Note that as described below, the different attributes will also result in different captured data types: full transaction, RF part only, headers, upstream, downstream, etc.). At the same time, commonalities exist between issues. For example, excellent RF, low channel utilization, and reduced number of users are unlikely to be conducive to troubleshooting tickets. Conversely, poor RF and high channel utilization are parameters likely to be common to several issue types. As such, the techniques herein leverages both general parameters and issue-specific parameters, accordingly.

Specifically, according to one or more embodiments herein, the profiles 430 may include issue-specific coefficients (sj) and general coefficients (gj). For example, gj is a weight determined for all attributes in the database. Weight seed can be manual (e.g., an operator evaluates the relative importance of each attribute to all issues), but can also be seeded randomly, and trained as explained below (e.g., machine learning). Conversely, sj is the relative weight of attributes that are specific to a given issue. Note that sj is a subset of gj, as a given issue will likely display some attributes that are in general important (e.g., low received signal strength indicator, "RSSI"), but will not display all general attributes (e.g., "can't connect" will typically not include a "slow DHCP" (dynamic host configuration protocol) attribute).

In certain embodiments, and in general, issue attributes can be dynamic. For example, software code updates (client and/or infrastructure), new hardware with specific behavior, etc., may be introduced that would change parameters associated to a given issue profile. The prediction model herein is thus configured flexible enough to account for these variations based on "network changes" (i.e., changes that would affect the network in some manner).

In one or more embodiments herein, various machine learning algorithms may be used herein as the algorithm to generate the profiles 430 associated with the wireless network issues 440. For example, a learning model may be supervised, and the system may be seeded (training set) with data collected from existing (open or solved) troubleshooting tickets. Each ticket, in particular, may be accompanied with specific numerical and/or categorical data, such as time of the issue (e.g., converted to a time window series), user and device details (e.g., station model, operating system, etc.), issue location (e.g., particular access point(s), particular LANs, particular geographic locations, etc.), issue type (e.g., connection loss, poor VoFi (voice over wireless) quality, etc.), along with a detailed circumstantial issue description. Detailed circumstantial issue descriptions, in particular, may include such things as, for example, was the user moving, what application was in use, traffic five-tuple details (source address, source port, destination address, destination port, and protocol), general information about traffic and user density, behavioral context (e.g., large meeting, "user moving to a quiet location", "repeated issue occurrence at this location", etc.), and so on.

Notably, the techniques herein may first estimate the similarity between issues in the dataset (normalizing factor). This issue-issue pairwise similarity can be determined by calculating a weighted sum of all J attributes, and incorporates both parameter-specific and general parameters attributes. For a set of parameters P and two issues Ii and Ik, the similarity Sp between these issues si can be computed as $Sp(Ii,Ik)=(½J)*Sum(j=1 \text{ to } J)sj*gj(Ii,Ik)$. Two issues have a high pairwise similarity if they are similar along attributes that are important specifically to that issue set of parameters, and generally to all parameters. They are likely to have common causes, and appear as the same set of attributes gets detected. Similarly, parameter-issue similarly can be estimated to measure if a given list of parameters (within profile 430) is meaningful enough to be associated to a given issue type 440. A softmax exponent may be used to introduce flexibility to the association (e.g., allowing the operator to control how strict the parameter similarity has to be to parameters of a given issue to be deemed a "contributor"). The similarity Ss(P,I) between a set of parameters P and an issue I can be computed as $Ss(P,I)=((½P)*Sum(i=1 \text{ to } P)Sp(I)^d)^{(1/d)}$, where d is 1 or higher (softmax exponent).

In this example, starting with the seed, issues can be added iteratively to the set. At each iteration, the candidate issue with the highest parameter-issue similarity is tentatively added to the set. Then the set cohesion is evaluated, which measures the cohesiveness of the set as a parameter of the issue. While the cohesion is large enough, the set is grown. The set stops growing below a configurable threshold.

Regarding attribute comparison herein, each pairwise attribute similarity compares two issues along a given attribute. Attributes are either categorical or numerical. Categorical attributes are attributed a commonality weight (e.g., two smartphones have a higher form factor commonality weight than a laptop and a smartphone). Numerical attributes are associated in a weighted linear combination. However, it should be noted that most numerical attributes appear as exact values (e.g., ticket was opened at 2:37 PM) but in fact are based on value ranges (e.g., the issue "just happened", which can be any range between 2:37 and some time in the early afternoon). Therefore, exact values may be converted to a probability window (e.g., simple probability around Gaussian representation of the parameter to be approximated). A similarity measure may be used to limit the impact of this probabilistic approach on numerical parameters comparison. The similarity decays exponentially with the distance between two data values (for example, a scaling factor f is chosen artificially to represent 120 minutes, and the similarity measure $Sj(Ii,Ik):=\exp(-d(vi,vk)/f)$, where vi and vk are the values for attribute j for issues Ii and Ik, and d(vi,vk) is the distance between the values of attribute vi and attribute vk).

The comparisons above allow the creation of a profile 430 for a specific issue 440 (e.g., time of day, location, device type, detected OS, application type, user and traffic density over the wireless and wired networks, detected user movement [roams, RSSI degradation], etc.). As noted above, general network observation tools are deployed in most networks that provide general telemetry measures about various KPI states, but the collection interval renders these tools unusable for direct data collection in a troubleshooting context. The techniques herein, on the other hand, can use the issue profiles to trigger traffic capture in locations and times when a combined set of parameters reach a large enough issue probability.

Figure 5:
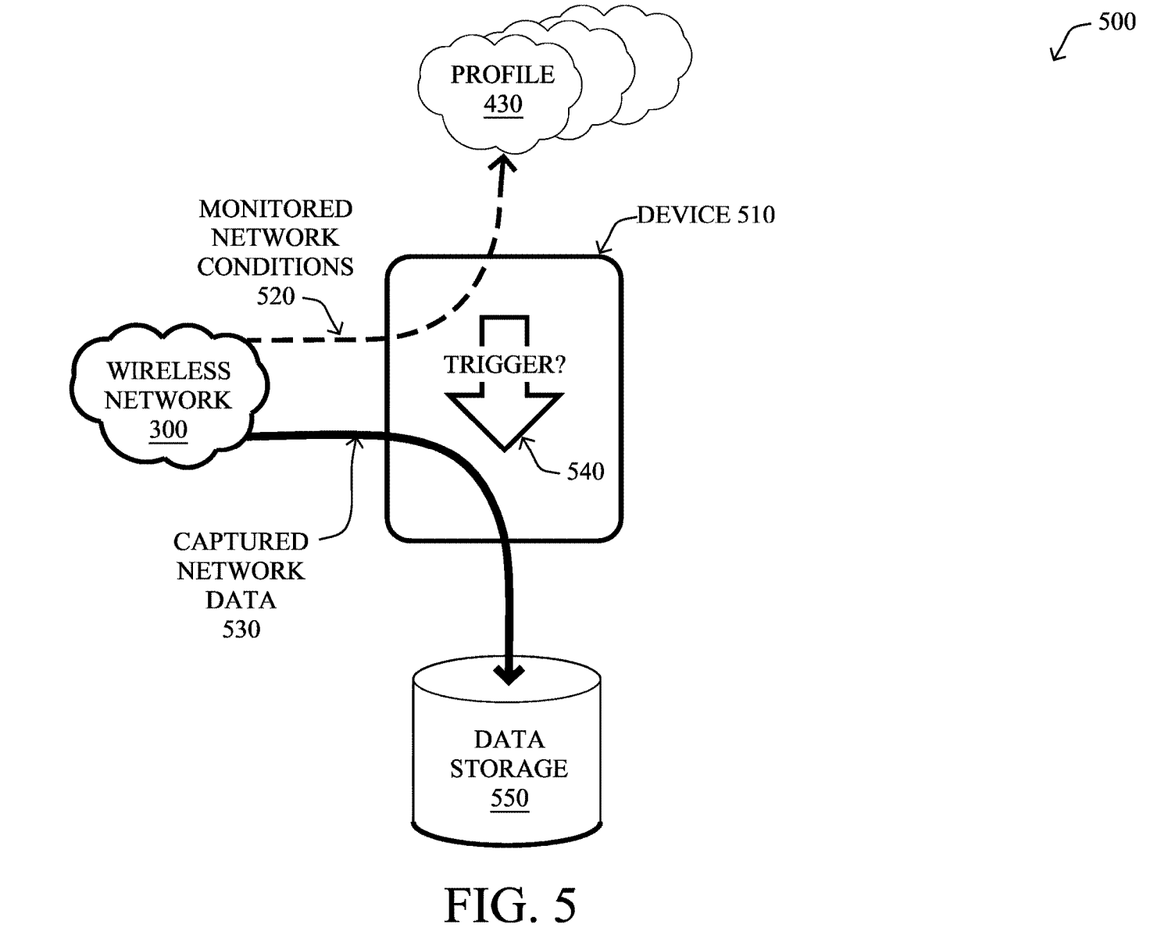
FIG. 5 illustrates an example of proactive wireless traffic capture.

In particular, with reference to the simplified system 500 shown in FIG. 5, a device 510 associated with a wireless network 300 (e.g., an access point 320, server 335, other centralized controller or even a specific device 310 itself) may monitor network conditions 520 (e.g., wireless traffic 340, conditions of access points, user counts, time of day, and so on). In the event that the conditions match a profile 430 with sufficient probability that an issue could soon be occurring, or already is occurring, then a trigger condition 540 is met, causing the device to begin capturing and storing network data 540 into data storage 550 (e.g., local storage, remote storage, cloud storage, etc.).

Note that the sensitivity of the trigger can be configured manually or dynamically, such as based on the available storage space (e.g., sensitivity increases linearly as storage space decreases). Also, each issue type can be associated with a capture requirement (e.g., start capturing as soon as parameter set reaches probability p that issue of type Ii is about to appear, capture on one AP or over a region set, capture all traffic or only headers, unidirectional or multi-directional capture, etc.).

Specifically, the granularity of the capture and storage is flexible. Since the sensitivity weight and the decay speed can both be customized (manually or dynamically), the sensitivity of the issues can also vary. This has two advantages: (a) in networks where storage is an issue, the capture trigger can dynamically vary based on the storage space still available, e.g., in a weighted random early detection (WRED) logic applied to capture, where the sensitivity decreases with the remaining storage space, so we start capturing later (when a higher probability threshold is reached) as storage space decreases; and (b) this flexibility allows for day-0 detection. That is, when sensitivity is high, issues that appear with new parameters (e.g., a new operating system beta version on a new smartphone) or with slightly varying characteristics can be separated from general issues with similar (but not all common or identical) parameters. This allows networks to test for new clients, operating systems, or variations of the environment while inputting into the system the parameters that should have a new/different level of sensitivity, and avoiding the situation where the issues are grouped with another solely because of the weight of past learning.

Each of the dynamic aspects of the capture and storage is important to point out, since analyzing past issues to predict future issues has been done by focusing on a static flat database of conditions (parameters), or deep dives into past records of traffic exchanges (full captures, or logs etc.). The techniques herein, on the other hand, dynamically start captures only when conditions susceptible to result in an issue reach a probability threshold. By classifying issues, the techniques herein can anticipate categories of issues, and dynamically collect only the contextual data that matters (e.g., full packets, or maybe only headers for some other issue types, etc.). The storage of the data captures, therefore, can be much smaller than traditional full capture logics. In addition, the captures may be sliced into small "chunks", so instead of having a large disk of 500 GB of captures for all traffic in a building on a particular day to research to find the issue at hand, the techniques herein may provide three small captures, each generated around a possible issue type, and identified as such. Sorting the capture is thus much easier than with traditional full capture methods This dynamic traffic capture system thus allows first and second layer support teams to access a set of captures which, along with system logs and alarm traps, help a support team better understand the issue associated with new tickets. In turn, this understanding helps refine the ticket database, which can be used to refine the contributing weights of each issue type, once the contributing factors are identified and weighted.

Other uses of the stored data, such as machine learning training sets, issue mitigation (e.g., correcting for problematic parameters), and so on, may also be performed in accordance with the techniques herein.

Figure 6:
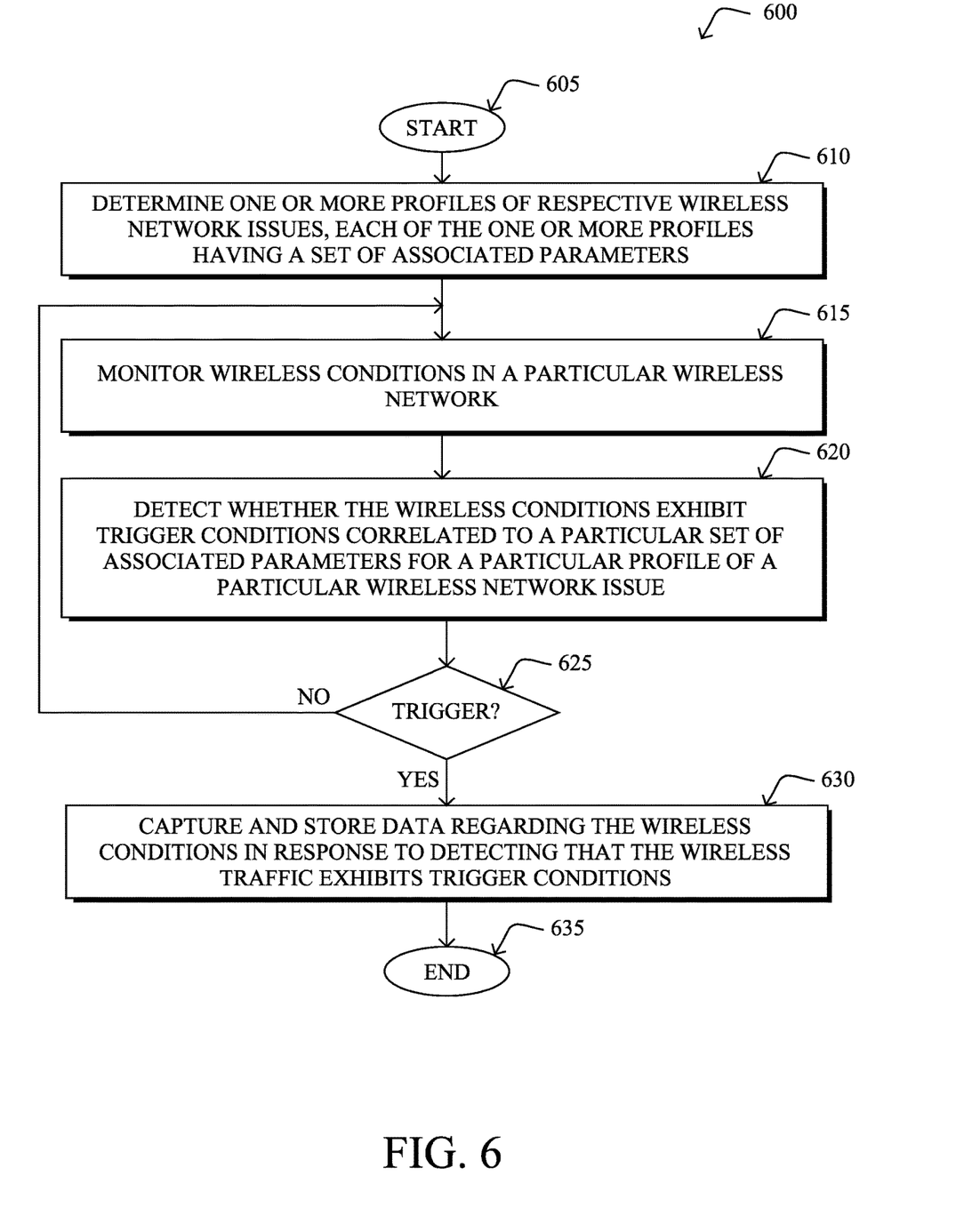
FIG. 6 illustrates an example simplified procedure for proactive wireless traffic capture for network assurance.

FIG. 6 illustrates an example simplified procedure for proactive wireless traffic capture for network assurance in accordance with one or more embodiments described herein. For example, a non-generic, specifically configured device (e.g., device 200, such as an access point, server, central controller, etc.) may perform procedure 600 by executing stored instructions (e.g., process 248). The procedure 600 may start at step 605, and continues to step 610, where, as described in greater detail above, the computing device determines one or more profiles 430 of respective wireless network issues 440, each of the one or more profiles having a set of associated parameters (e.g., one or both of issue-specific parameters and general parameters). Note that as also mentioned above, the techniques herein may weight individual parameters of the set of associated parameters, such as through one or both of machine learning weighting and manual weight input.

In step 615, the computing device monitors wireless conditions 520 in a particular wireless network 300 (e.g., traffic 340 or other conditions/parameters), and can detect in step 620 whether the wireless conditions exhibit trigger conditions correlated to a particular set of associated parameters for a particular profile of a particular wireless network issue. In particular, as described in greater detail above, trigger conditions may be exhibited based on surpassing a probability threshold that conditions of the wireless network will result in a given wireless network issue. (Note also that the probability threshold may be adjusted, such as based on storage availability; i.e., "sensitivity").

In response to detecting that the wireless conditions exhibit trigger conditions in step 625, then in step 630 the device may initiate capturing and storing of data regarding the wireless conditions, accordingly. The data may comprise raw traffic, or else may be contextually specific data for the particular wireless network issue (e.g., only headers, or only RSSI values, etc.), as well as other data and parameters as described above. Step 630 may continue to capture the data for a given time, or else may capture the data until the wireless conditions no longer exhibit the trigger conditions. Also, as mentioned above, the storage of the data may occur with a decay time specifically associated with the particular wireless network issue (e.g., storing some data longer than other data), or until the data is used. Note further that the stored data may be separated into groups based on the wireless network issue causing the capturing, as mentioned above.

The simplified procedure 600 may then end in step 635, notably with the option to either continue monitoring network conditions for further triggers, or else to update parameters of the set of associated parameters for the one or more profiles of respective wireless network issues in response to one or more changes in the wireless network, as pointed out above.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for proactive wireless traffic capture for network assurance. In particular, the techniques herein address the problem of full-time, full packet capture by providing a dynamic approach that uses the past issues to predict future issues, and to correspondingly trigger full traffic capture based on this prediction. As noted, may wireless devices (e.g., APs) typically have limited resources (e.g., processing, storage, etc.), so the techniques herein more intelligently capture data based on predicted issues, and may be specifically limit the capture to certain parts of network, certain types of traffic, certain lengths of time, and so on. Further, the intelligent expiration of stored data also helps limit the burden of storing large amounts of data, which sometimes is unnecessary (e.g., no issue actually occurred). Moreover, the machine learning/behavioral analytics aspects of the packet capture and storage control provide numerous advantages over static or manual on/off recording techniques currently available.

While there have been shown and described illustrative embodiments that provide for proactive wireless traffic capture for network assurance, it is to be understood that various other adaptations and modifications may be made within the spirit and scope of the embodiments herein. For example, while certain embodiments are described herein with respect to using certain algorithms for purposes of wireless network issue prediction, the algorithms are not limited as such, and other algorithms may be used in other embodiments. In addition, while certain protocols are shown, such as Wi-Fi, other suitable wireless protocols that may be subjected to issues may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   determining, by a computing device, one or more profiles of respective wireless network issues that are reported by users of wireless networks, each of the one or more profiles having a) a set of associated parameters are indicative of a particular wireless network issue and b) data capture and storage requirements associated with the particular wireless network issue;
   monitoring, by the computing device, wireless conditions in a particular wireless network of the wireless networks;
   detecting, by the computing device, that the wireless conditions exhibit trigger conditions are correlated to a particular set of associated parameters of a particular profile of the one or more profiles, wherein the particular profile is associated with a given wireless network issue, further wherein the trigger conditions comprise a probability threshold that conditions of the particular wireless network will result in the given wireless network issue and storage availability of the computing device; and
   capturing and storing, by the computing device and according to data capture and storage requirements of the particular profile, data regarding the wireless conditions in response to detecting that the wireless conditions exhibit the trigger conditions, wherein the data regarding the wireless conditions is contextually specific data for the given wireless network issue because of the data capture and storage requirements of the particular profile.

2. The method as in claim 1, wherein the set of associated parameters for the one or more profiles comprise one or both of issue-specific parameters and general parameters.

3. The method as in claim 1, wherein the trigger conditions are exhibited based on surpassing the probability threshold that conditions of the wireless network will result in a given wireless network issue.

4. The method as in claim 3, further comprising:
   adjusting the probability threshold based on the storage availability.

5. The method as in claim 1, further comprising:
   storing the data with a decay time specifically associated with the particular wireless network issue.

6. The method as in claim 1, further comprising:
   capturing the data until the wireless conditions no longer exhibit the trigger conditions.

7. The method as in claim 1, further comprising:
   capturing the data for a given time.

8. The method as in claim 1, further comprising:
   weighting individual parameters of the set of associated parameters for the one or more profiles of respective wireless network issues.

9. The method as in claim 8, wherein weighting is performed by one or both of machine learning weighting and manual weight input.

10. The method as in claim 1, further comprising:
updating parameters of the set of associated parameters for the one or more profiles of respective wireless network issues in response to one or more changes in the wireless network.

11. The method as in claim 1, further comprising:
separating the stored data into groups based on the wireless network issue causing the capturing.

12. A tangible, non-transitory, computer-readable medium storing program instructions that cause a computing device to execute a process, comprising:
determining one or more profiles of respective wireless network issues that are reported by users of wireless networks, each of the one or more profiles having a) a set of associated parameters are indicative of a particular wireless network issue and b) data capture and storage requirements associated with the particular wireless network issue;
monitoring wireless conditions in a particular wireless network of the wireless networks;
detecting that the wireless conditions exhibit trigger conditions are correlated to a particular set of associated parameters of a particular profile of the one or more profiles, wherein the particular profile is associated with a given wireless network issue, further wherein the trigger conditions comprise a probability threshold that conditions of the particular wireless network will result in the given wireless network issue and storage availability of the computing device; and
capturing and storing, according to data capture and storage requirements of the particular profile, data regarding the wireless conditions in response to detecting that the wireless conditions exhibit the trigger conditions, wherein the data regarding the wireless conditions is contextually specific data for the given wireless network issue because of the data capture and storage requirements of the particular profile.

13. The computer-readable medium as in claim 12, wherein the set of associated parameters for the one or more profiles comprise one or both of issue-specific parameters and general parameters.

14. The computer-readable medium as in claim 12, wherein the trigger conditions are exhibited based on surpassing the probability threshold that conditions of the wireless network will result in a given wireless network issue.

15. An apparatus, comprising:
one or more network interfaces to communicate with a computer network;
a processor coupled to the network interfaces and configured to execute one or more process; and
a memory configured to store a process executable by the processor, the process when executed configured to:
determine one or more profiles of respective wireless network issues that are reported by users of wireless networks, each of the one or more profiles having a) a set of associated parameters are indicative of a particular wireless network issue and b) data capture and storage requirements associated with the particular wireless network issue;
monitor wireless conditions in a particular network of the wireless networks;
detect that the wireless conditions exhibit trigger conditions are correlated to a particular set of associated parameters of a particular profile of the one or more profiles, wherein the particular profile is associated with a given wireless network issue, further wherein the trigger conditions comprise a probability threshold that conditions of the wireless network will result in the given particular wireless network issue and storage availability of the apparatus; and
capture and store, according to data capture and storage requirements of the particular profile, data regarding the wireless conditions in response to detecting that the wireless conditions exhibit the trigger conditions, wherein the data regarding the wireless conditions is contextually specific data for the given wireless network issue because of the data capture and storage requirements of the particular profile.

16. The apparatus as in claim 15, wherein the set of associated parameters for the one or more profiles comprise one or both of issue-specific parameters and general parameters.

17. The apparatus as in claim 15, wherein the trigger conditions are exhibited based on surpassing the probability threshold that conditions of the wireless network will result in a given wireless network issue.

* * * * *